United States Patent Office 3,491,702
Patented Jan. 27, 1970

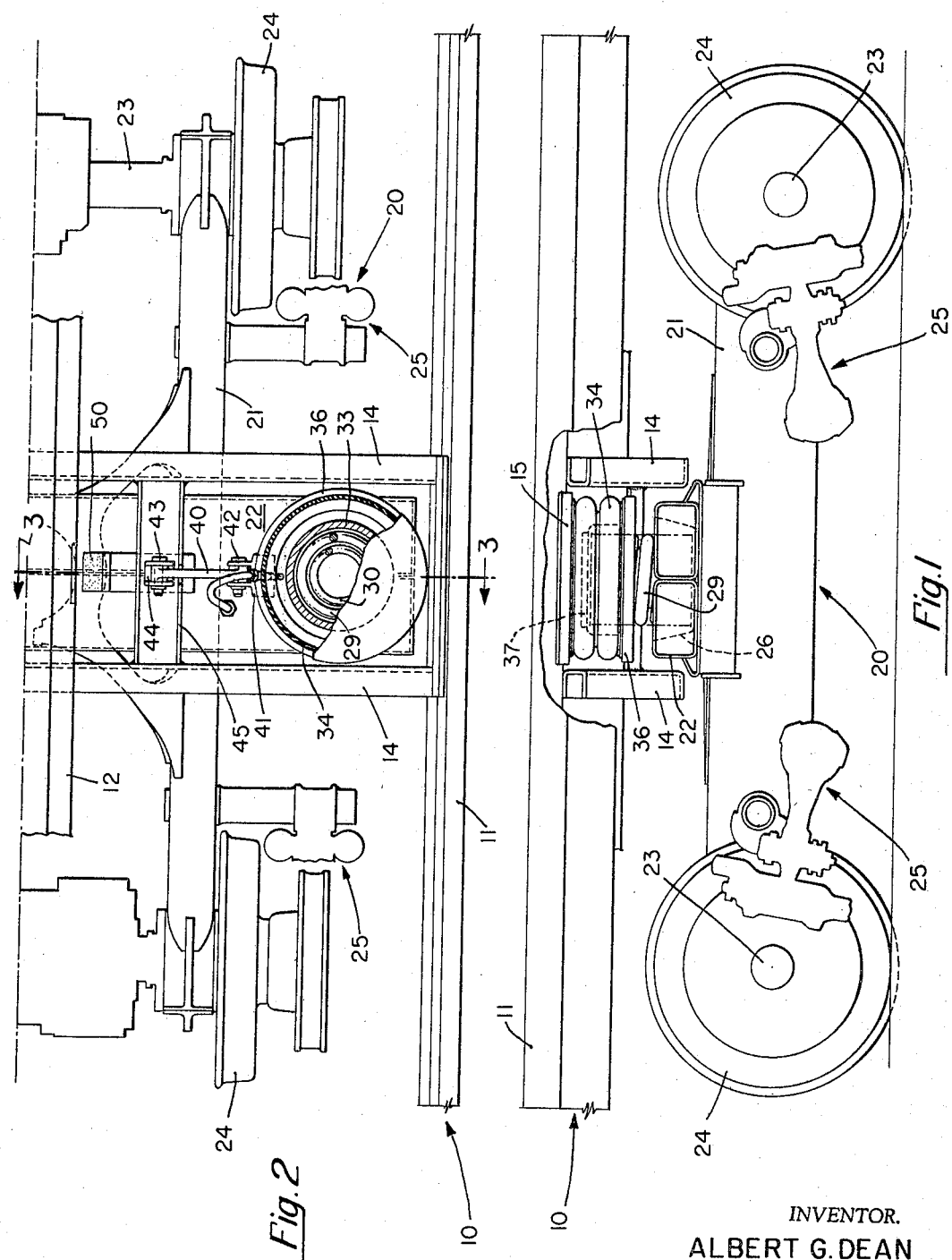

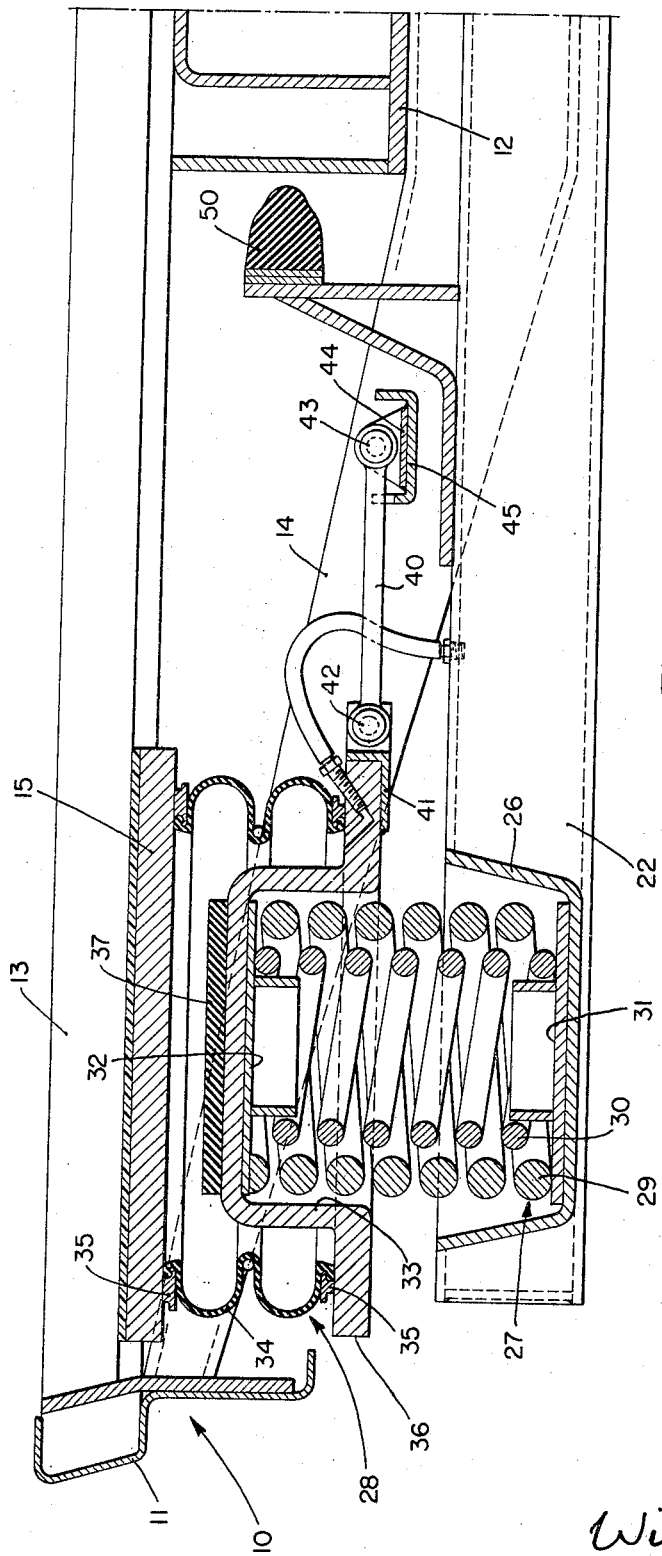

3,491,702
SERIES PNEUMATIC AND COIL
SPRING ASSEMBLY
Albert G. Dean, Narberth, Pa., assignor to The
Budd Company, Philadelphia, Pa., a corporation of Pennsylvania
Filed Aug. 11, 1967, Ser. No. 659,948
Int. Cl. B61f 5/00, 5/06, 5/10
U.S. Cl. 105—199                                    3 Claims

ABSTRACT OF THE DISCLOSURE

This application discloses a spring support for vehicles, especially railway passenger cars, in which air spring means and solid structural spring means are combined to provide improved effects beyond those attainable by either alone or by any combinations of such spring means so far as known to have been heretofore proposed.

BACKGROUND OF THE INVENTION

From early times the usual and simplest means for absorbing the shock between roadway and vehicle body has been solid resilient structural spring means comprising leaf springs, coil springs, torsion springs, resilient pads, and the like.

For a long time pneumatic or air spring means have been used to supplement or substitute for solid structural springs. Pneumatic spring means provide a soft ride and have other known advantages and might have come into more general use except for numerous adverse factors which are well-known, such as high initial cost, inadaptability to varying loads except by complex and expensive compensating means, susceptability to failure, and the like. There seems to be a present general conclusion that air springing is feasible only on larger types of vehicles which can afford the higher installation and maintenance costs and care.

Air springs have been used very successfully on railway passenger cars. One example of a railway car truck having air springs is found in the patent to W. B. Dean 2,908,230 granted Oct. 13, 1959.

When such air spring installations are adequately maintained and do not have unexpected failures they provide a very superior ride. However, they do have certain inherent weaknesses such as a tendency to fail under constant lateral flexure, such lateral movement being one of the usual expected requirements of a good spring support system. When failure or overloading does not occur the air spring is adequate but when it does occur the load is suddenly transferred to nearly solid structural supporting means such as cushion type solid rubber.

Some attempts have been made to combine pneumatic spring means with solid structural spring means. One example, selected for illustration, is found in Johannsen 2,989,301, granted June 20, 1961. There, as in other such systems so far as known, the air spring means and the solid structural spring means are arranged and act in parallel. Some known systems act in series-parallel, but in these the major portion of the load is always carried through the structural springs and the air spring means acts only as a buffer or shock absorber and is so restrained by the structural spring means that it cannot give the full benefits of an air suspension system.

SUMMARY OF INVENTION

The present invention has as its main objective the provision of a body supporting spring system which will meet the needs of very high speed luxury passenger vehicles: first, by providing the normal comfort of air spring support; second, by providing the normal comfort of good structural spring support in case the air spring means are overloaded or should fail; third, by providing a combined spring system which will avoid the chance of accident due to solid blows which occur when an all-air spring system fails; fourth, to provide air spring components which are protected from the usual lateral deflections which lead to early failure in an all-air spring system; and fifth, to reduce the reservoir capacity and time delay response of an all-air spring system. There are other objects, advantages, and features of novelty which will be apparent from the present disclosure.

Briefly, the invention provides pneumatic and structural spring means in series as the sole support at any given loading point with the two spring means elements being partially telescoped together to minimize the volume capacity and movement of the air spring means and provide a reserve support by the structural spring means alone which is fully equal to that provided by the best usual structural spring systems.

DRAWINGS

The invention will be described in connection with a specific illustrative embodiment shown in the accompanying drawings, in which:

FIG. 1 is a partial side elevation, with parts broken away in section, of a railway car and truck at one end;

FIG. 2 is a top plan view of the assembly shown in FIG. 1, the view being taken below the floor of the body;

FIG. 3 is an enlarged transverse section taken on the line 3—3 of FIG. 2.

DESCRIPTION OF PREFERRED EMBODIMENT

One corner of a car body 10 is shown as having a side sill structure 11, a center sill structure 12, floor beams 13, and bolsters 14, the bolsters being spaced apart longitudinally. Reinforcing means 15 are provided in the spring supporting zones of the body floor structure.

A supporting truck 20 may be of the same general type as that shown more completely in the W. B. Dean patent mentioned above, only so much of the truck being shown herein as is needed to provide environmental orientation for the present spring supporting assembly.

The truck comprises side frame members 21 and a transverse truck bolster or load bearing member 22 mounted on axles 23 and wheels 24. A brake assembly of the disk type is denoted as a whole by the numeral 25. Below the body reinforcement 15, the truck is provided with a lower spring seat 26.

The spring system or assembly with which the present invention is concerned comprises solid structural spring means 27 and air spring means 28 in series, the air spring means, as illustrated, being above the structural spring means.

The spring system or assembly with which the present coil spring and a lighter inner coil spring 30 carried between a lower core-flanged positioning plate member 31 and a like upper positioning plate member 32. The upper plate member 32 is carried within an inverted or downwardly cupped floating flanged spring seat 33.

The air spring means comprises a flexible bellows 34 having end anchor rings 35 secured to the reinforcing means 15 at the upper end and to the flange 36 of the floating spring seat 33 at the lower end. A solid resilient buffer or bumper pad 37, as of rubber or other suitable elastomeric material is arranged between the reinforcing plate 15 of the car body and the upper end of the floating inverted cup-shaped spring seat 33.

The usual means are provided for supplying pneumatic fluid to the air spring means and regulating the pressure according to car loading to maintain a fixed or varying floor height, depending on needs. This can be understood without illustration since it is a usual accessory of air spring installations. It is usual to have supplemental reservoir means for air springs and it is to be noted that the series telescopic arrangement of the present invention provides a relatively long bellows but a short travel and small air space which requires a very small air reservoir capacity, about 25 percent of that needed for an all-air support.

It is arranged that practically all the lateral movement required for a comfortable ride is provided by the solid structural spring means and this is ample because the coil springs are relatively long due to their telescopic arrangement with the air spring bellows. Lateral transverse movement of the bellows is restricted and almost eliminated by a transverse bar or radius bar 40 which is pivoted at the outboard end to the floating spring seat 33, as by a fitting 41 and pivot pin 42, and is pivoted at the inboard end by a pivot pin 43 secured on a fitting 44 carried by a longitudinal beam 45 secured between the longitudinally spaced bolsters 14 of the body. This provides adequate vertical movement with almost no lateral movement and greatly prolongs the life of the bellows which normally fails largely because of repeated excessive lateral movements. Longitudinal side movement is here restricted by the spaced car bolsters but if it should be needed a longitudinal restraining rod similar to the bar 40 could be provided.

Buffer means 50 of usual form is provided between the truck and body on each side of the car center sill.

The radius rod 40 is shown at a preferred height for a simple construction but this can be varied to provide a wide variety of lateral suspension characteristics by controlling the restraining moment on the upper end of the coil spring. Lateral movement is governed substantially solely by the coil spring.

It will be seen that the straight series arrangement of air and coil springs provides important advantages over either system alone and over any known parallel or series-parallel arrangement. The straight or full series provided hereby avails of the best characteristics of each system, giving the soft ride and levelling advantages of the air system with the full dependability and long life of a structural spring system which takes substantially all the lateral movement to give much longer life to the air system by keeping lateral movements off that system, the structural system in emergency of overload or air system failure taking the whole movement and still providing a ride which is as good as that of the better structural spring systems now available.

While one embodiment of the invention has been described for purposes of illustration, it is to be understood that there may be various embodiments and modifications within the invention.

What is claimed is:

1. In a railway vehicle having a body supported by spring means on the bolster of a railway truck, said body and said bolster each having mounting means for said spring means, comprising, coil spring means and pneumatic bellows spring means secured together in series alignment with a member therebetween, said coil spring means and said pneumatic bellows spring means being mounted to said body and said bolster mounting means, the full body load normally passing through said pneumatic bellows spring means and said coil spring means, laterally restraining rod means pivotally connected at one end to said member between said pneumatic bellows spring means and said coil spring means and the other end pivotally connected to the mounting means for said pneumatic spring means to restrain the same against lateral movement, leaving lateral movement between the body and the bolster of the truck to be taken in deflection by the coil spring means.

2. In the railway vehicle as set forth in claim 1 wherein said member between said pneumatic bellows spring means and said coil spring means constitutes a cover for the pneumatic spring means and a seat for said coil spring means.

3. In the railway vehicle as set forth in claim 2 wherein a portion of said coil spring means is located inside said pneumatic air spring means and wherein said member is cup shaped to receive said portion of said spring means.

References Cited

UNITED STATES PATENTS

| 811,622 | 2/1906 | Downer | 105—200 XR |
| 2,896,551 | 7/1959 | Lich | 105—197 XR |
| 3,045,998 | 7/1962 | Hirst | 267—3 |
| 3,012,521 | 12/1961 | Lich | 105—141 |

ARTHUR L. LA POINT, Primary Examiner

HOWARD BELTRAN, Assistant Examiner

U.S. Cl. X.R.

105—197; 267—3, 34